(12) United States Patent
Shnitko et al.

(10) Patent No.: US 8,527,507 B2
(45) Date of Patent: Sep. 3, 2013

(54) CUSTOM RANKING MODEL SCHEMA

(75) Inventors: Yauhen Shnitko, Redmond, WA (US); Karen Beattie Massey, Issaquah, WA (US); Dmitriy Meyerzon, Bellevue, WA (US); Victor Poznanski, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 12/630,981

(22) Filed: Dec. 4, 2009

(65) Prior Publication Data

US 2011/0137893 A1 Jun. 9, 2011

(51) Int. Cl.
*G06F 7/00* (2006.01)

(52) U.S. Cl.
USPC ........................................................ 707/723

(58) Field of Classification Search
USPC ........................................ 707/723, 748, 713
See application file for complete search history.

(56) References Cited

U.S. PATENT DOCUMENTS

| | | | |
|---|---|---|---|
| 6,601,075 B1 | 7/2003 | Huang et al. | |
| 6,954,755 B2 | 10/2005 | Reisman | |
| 7,376,642 B2 | 5/2008 | Nayak et al. | |
| 2006/0184516 A1* | 8/2006 | Ellis .................................. | 707/3 |
| 2006/0248094 A1 | 11/2006 | Andrews et al. | |
| 2007/0233456 A1* | 10/2007 | Kim .................................. | 704/2 |
| 2009/0006315 A1* | 1/2009 | Mukherjea et al. ................ | 707/2 |
| 2009/0138463 A1* | 5/2009 | Chapelle ........................... | 707/5 |
| 2011/0035374 A1* | 2/2011 | Vadrevu et al. .................. | 707/728 |

OTHER PUBLICATIONS

Theobald, et al., "The Index-based XXL Search Engine for Querying XML Data with Relevance Ranking", Retrieved at <<http://citeseerx.ist.psu.edu/viewdoc/summary?doi=10.1.1.11.9191>>, Proceedings of the 8th International Conference on Extending Database Technology: Advances in Database Technology, 2002.

Egnor, et al., "Structured Information Retrieval using XML", Retrieved at <<http://www.haifa.il.ibm.com/sigir00-xml/final-papers/Egnor/index.html>>, Sep. 18, 2009.

Bao, et al., "Effective XML Keyword Search with Relevance Oriented Ranking", Retrieved at <<http://www.jiahenglu.net/paper/icde2009.pdf>>, Proceedings of the 2009 IEEE International Conference on Data Engineering, 2009.

Hayashi, et al., "Searching Text-Rich XML Documents with Relevance Ranking", Retrieved at <<http://www.haifa.il.ibm.com/sigir00-xml-final-papers/Hayashi/hayashi.html>>, ACM SIGIR 2000 Workshop on XML and Information Retrieval, Jul. 28, 2000.

Guo, et al., "Xrank: Ranked Keyword Search over XML Documents", Retrieved at <<http://www.cs.cornell.edu/~cbotev/XRank.pdf>>, Proceedings of the 2003 ACM SIGMOND international conference on Management of data , Jun. 9-12, 2003.

* cited by examiner

*Primary Examiner* — Truong Vo
(74) *Attorney, Agent, or Firm* — Turk IP Law, LLC

(57) ABSTRACT

A customizable ranking model of a search engine using custom ranking model configuration and parameters of a predefined human-readable format. The architecture can employ a markup language schema to represent the custom ranking model. In one implementation, the schema developed utilizes XML (extensible markup language) for representing the custom ranking model. Weights for dynamic and static relevance ingredients can be altered per ranking model and new relevance ingredients can be added. Additionally, features are provided for improving relevance such as adding terms to a thesaurus for synonym expansion, for example, the ability to deal with single terms either as compounds, and/or using custom word breaking rules.

18 Claims, 5 Drawing Sheets

CUSTOM RANKING MODEL SCHEMA

BACKGROUND

Typically, a search engine utilizes a ranking function to predict the degree of relevance of a document to a particular query. The ranking function takes multiple features from the document as inputs and computes a number that allows the search engine to sort the documents by predicted relevance. The ranking function (including its parameters) may be built into the search engine, or the search engine may allow the specification of multiple custom ranking functions. However, extensive and sophisticated customization of ranking models by the average administrator is non-existent.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture supports customization of a ranking model of a search engine using custom ranking model configuration and parameters of a pre-defined format. The architecture employs a markup language schema to represent the custom ranking model. In one implementation, the schema developed utilizes XML (extensible markup language) for representing the custom ranking model. However, other equivalent representations can be employed.

More specifically, administrators are now provided with the capability to tune relevance by enabling the creation of multiple ranking models that can be tuned for specific languages, verticals, and/or site experiences. Moreover, two models can allow an administrator to custom tune another model with reference to a baseline, for example. The weights for dynamic and static relevance ingredients can be altered per ranking model and new relevance ingredients can be added. Additionally, some aspects of the custom model can be exposed to administrators outside the model. For example, authoritative sites may need to be identified (along with site importance) as well as deprecated sites. Features are provided for improving relevance such as adding terms to a thesaurus for synonym expansion, for example, the ability to deal with single terms either as compounds, and/or using custom word breaking rules. These and other features can be true across all models, or localized.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
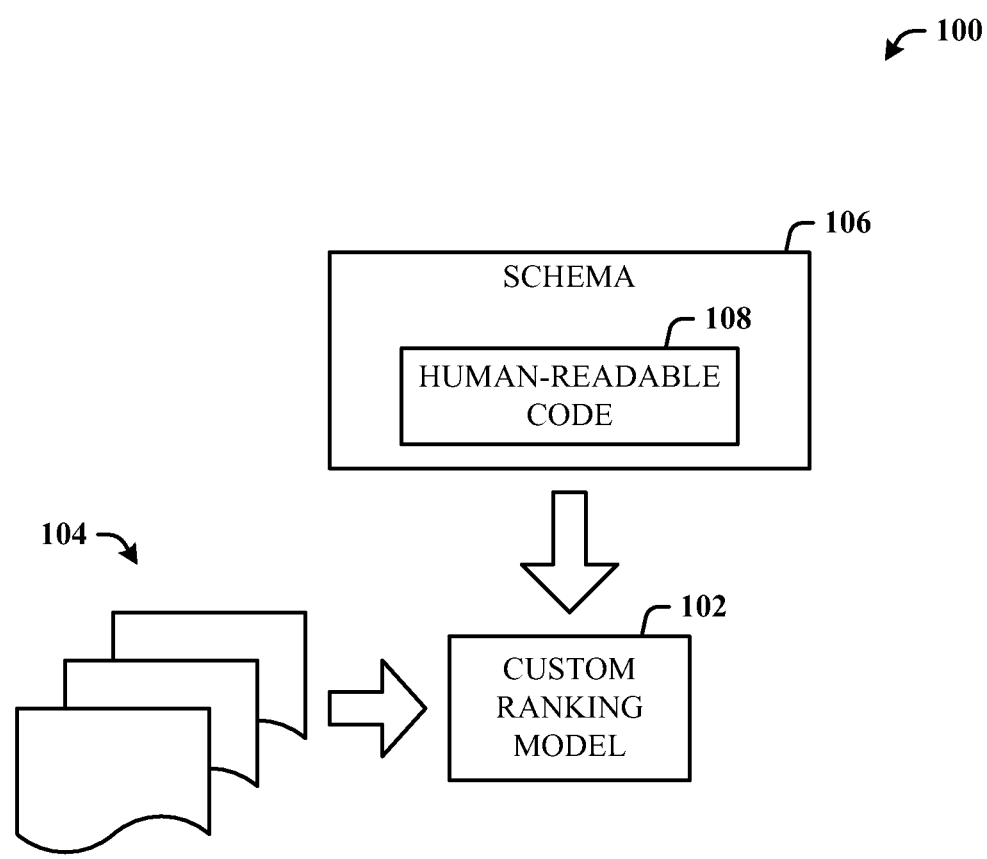
FIG. 1 illustrates computer-implemented ranking model system in accordance with the disclosed architecture.

A single ranking model means that all customizations to the model affect the search experience across the whole corpus. In the case of multilingual corpora or corpora that contain content for different audiences or even specialized search application, for example, search across customer data, new relevance ingredients or weighting existing relevance ingredients differently needs to be considered.

Creating separate ranking models and enabling the separate ranking models to be applied to a subset of the content in a corpus provides administrators a lower risk way to evaluate the changes made to relevance.

Moreover, picking selected language features such as improved handling of compounds and breaking rules provides a significant impact. This is applies particularly in Germany and Japan markets, for example, where specific search relevance issues can occur.

The disclosed architecture provides relevance tuning capabilities by way of a clearly defined schema. In one implementation, described in detail herein, the schema for custom ranking model is represented in XML (extensible markup language). However, other equivalent representations can be employed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates computer-implemented ranking model system 100 in accordance with the disclosed architecture. The system 100 can include a customizable ranking model 102 for ranking documents 104 resulting from a search, and a schema 106 that represents the customizable ranking model 102 in a schema written in a human-readable code 108 (e.g., a markup language). The human-readable code 108 can be extensible markup language (XML). The schema 106 facilitates application of a ranking function (e.g., BM25F) that manages query terms associated with multiple streams of data.

The schema can represent query dependent ranking features and query independent ranking features. The schema can also represent a ranking model element that includes parameters for at least one of a static feature, a static feature for a small number of enumerable values, or query language matching. The schema can represent a ranking model element that includes a list of weightings for possible values of a feature, and ranking model elements that describe at least one of a rational transform type and associated parameters or inverse rational transform type and associated parameters. The schema can also represent ranking model elements that describe at least one of a linear transform and associated parameters or a logarithmic transform and associated parameters. These are just a few examples of the features that can be represented. Other features and elements can be utilized as desired in support of the customizable ranking model 102.

Figure 2:
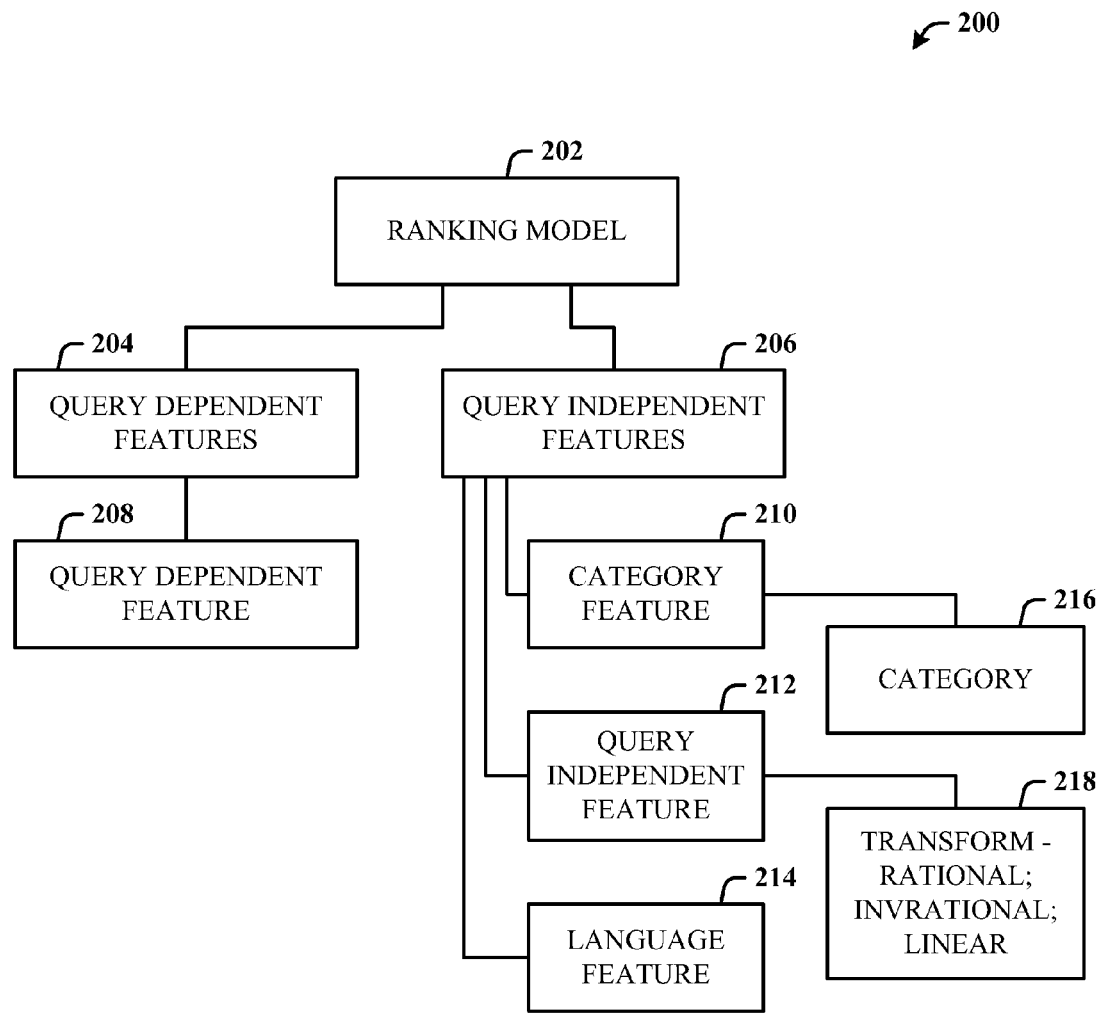
FIG. 2 illustrates a simplified diagram of the features and elements of the schema for the custom ranking model.

FIG. 2 illustrates a simplified diagram of the features and elements of the schema 200 for the custom ranking model. The schema 200 includes a root level ranking model element 202. The ranking model element 202 has two child elements: a query dependent features element 204 and a query independent features element 206. The query dependent features element 204 has a child query dependent feature element 208. The query independent features element 206 has three child elements: a category feature element 210, a query independent feature element 212 and a language feature element 214. The category feature element 210 further has a child category element 216. The query independent feature element 212 has a child transform element 218 for providing four transforms: a rational transform (transformRational), an inverse rational transform (transformInvRational), a linear transform (transformLinear), and a logarithmic transform (transformLogarithmic). Note that the schema 200 described herein is just one example markup language schema. Alternatively, other representations can be utilized as desired. Moreover, other elements and features can be utilized as well.

Each of these elements and features will now be described in detail. The following description is one example of a schema that can be employed in custom ranking model search engines. This exemplary representation uses the XML (extensible markup language) in the schema.

The XML namespace of each element in custom ranking model can be "http://schemas.company.com/office/20xx/rankingModel". Attributes are all unqualified (no namespace).

The rankingModel element is a root element of the custom ranking model.

| Attribute | Mandatory | Meaning |
| --- | --- | --- |
| id | required | Unique model id - globally unique id (GUID) |
| name | optional | Name of the model - any descriptive string |
| description | optional | Description of the model - any descriptive string |

| Child Element | Cardinality | Meaning |
| --- | --- | --- |
| queryDependentFeatures | 1 | Parameters for BM25F feature; each queryDependentFeature (aka property) defined within this element is used for recall, that is the document matches query term when term can be found in at least one property. |
| queryIndependentFeatures | 0 . . . 1 | Query independent features with parameters. |

The queryDependentFeatures element defines one BM25F stream feature. Each element under queryIndependentFeatures defines one query independent ranking feature.

A child element to the rankingModel element is queryDependentFeature with the following attributes.

| Child Element | Cardinality | Meaning |
| --- | --- | --- |
| queryDependentFeature | 1 . . . * | Textual property participating in BM25 |

| Attribute | Mandatory | Meaning |
| --- | --- | --- |
| pid | required | Managed property id |
| name | optional | Name of property - any string |
| weight | required | Parameter w |
| lengthNormalization | required | Parameter b |

BM25F is computed with the following formula:

$$ScoreAdd = \left( \sum_{t \in Q} \frac{TF'_t}{1 + TF'_t} \cdot \log\left(\frac{N}{n_t}\right) \right)$$

$$TF'_t = \left( \sum_{p \in D} TF_{t,p} \cdot w_p \cdot \frac{1 + b_p}{\left(\frac{DL_p}{AVDL_p} + b_p\right)} \right)$$

where Q is a query, D is a document, t is a query term, p is a property (queryDependentFeature) of the document, $TF_{t,p}$ is the term frequency=number of times the term t appears in the property p of the document, $DL_p$ is the length of the property p (number of terms), $AVDL_p$ is the average length of the property in the collection, N (uppercase) is the number of documents in the corpus, $n_t$ is the number of documents containing the given query term t, and, $w_p$ and $b_p$ are parameters ($w_p$ is the importance or weight of that stream or field, and $b_p$ is the importance of length normalization).

The overall schema for score computation for any feature is as follows. The score of the document is computed according to the following formula:

$$Score = \sum_F ScoreAdd(F)$$

where ScoreAdd is a function of any feature described herein, and F is each ranking feature defined in the model.

A child element to the rankingModel element is queryIndependentFeature with the following attributes and list of query independent ranking features. Children can occur in any order. At least one child is presented if the queryIndependentFeatures element is presented.

| Child Element | Cardinality | Meaning |
| --- | --- | --- |
| categoryFeature | 0 . . . * | Parameters for static feature with small number of enumerable integer values (feature like FileType) |

-continued

| Child Element | Cardinality | Meaning |
| --- | --- | --- |
| queryIndependentFeature | 0 ... * | Parameters for static feature. |
| languageFeature | 0 ... * | Parameters for a case of categoryFeature - query language matching. |

A child element of the queryIndependentFeatures element is the categoryFeature element, defined with the following attributes and child element.

| Attribute | Mandatory | Meaning |
| --- | --- | --- |
| pid | required | Managed property id, defining static storage where raw feature value is taken from. |
| default | required | Default value (category) used when storage is not available. |
| name | optional | Name of feature - any string |

| Child Element | Cardinality | Meaning |
| --- | --- | --- |
| Category | 1 ... * | List with score additions for each possible value (integer) of the feature. |

$$ScoreAdd(x) = \text{number specified in} \frac{\text{category}[@\text{value} = x]}{@\text{weight}} \text{attribute}$$

The category element is a child element to the categoryFeatures element and can include the following attributes.

| Attribute | Mandatory | Meaning |
| --- | --- | --- |
| value | required | Raw feature value that defines this category |
| name | optional | Name of category - any string |
| weight | required | Weight = score addition for this category |

The queryIndependentFeature element is a child element to the queryIndependentFeatures element, includes parameters for a static feature, and is defined with the following attributes.

| Attribute | Mandatory | Meaning |
| --- | --- | --- |
| pid | required | Managed property id, defining static storage where raw feature value is taken from. |
| name | optional | Name of feature - any string |
| default | required | Default value used when storage is not available. |
| weight | required | Weight of this feature |

| Child Element | Cardinality | Meaning |
| --- | --- | --- |
| transformRational, transformInvRational, transformLinear, transformLogarithmic | choice (one of) | Type and parameters of transform function. |
| precompute | 0 ... 1 | Optimization parameters |

$$ScoreAdd(x) = \text{Transform}(x) \cdot W$$

where Transform is a transform function specified in the child element, and W is the weight. Note that the four transforms listed above are examples, in that other transforms can be employed as desired.

The languageFeature element is a child element to the queryIndependentFeatures element, is a query language matching feature, and can include the following attributes.

| Attribute | Mandatory | Meaning |
| --- | --- | --- |
| pid | Required | Managed property id, defining static storage from where LCID is taken. |
| name | Optional | Name of feature - any string |
| default | Required | Default value used when storage is not available; 0 or 1. |
| weight | Required | Weight of this feature |

The pid is a property id which contains an LCID, one per document. An LCID is the locale identifier, which is a number that represents a language/region/sort combination that can be associated with date, time, number, currency and other formatting, calendar preferences, input methods, sorting preferences, and more. The raw feature value is 1, if the primary language of the query is equal to the primary language of the stored LCID (except Chinese, where Chinese Simplified is considered different from Chinese Traditional) or LCID is neutral; otherwise, the raw feature value is 0. If no static storage is available for the specified pid, then the raw feature value is as specified in the default attribute.

$$ScoreAdd(x) = x \cdot W$$

where W is the weight.

The transformRational element is a child element to the queryIndependentFeature element, and includes the following attribute.

| Attribute | Mandatory | Meaning |
| --- | --- | --- |
| k | required | Parameter |

$$\text{Transform}(x) = \frac{x}{k + x}$$

The transformInvRational element is a child element to the queryIndependentFeature element, and includes the following attribute.

| Attribute | Mandatory | Meaning |
| --- | --- | --- |
| k | required | Parameter |

$$\text{Transform}(x) = \frac{1}{1 + k \cdot x}$$

The transformLinear element is a child element to the queryIndependentFeature element, and includes the following attribute.

| Attribute | Mandatory | Meaning |
| --- | --- | --- |
| max | required | Upper bound |

$$\text{Transform}(x) = \min(x, \max)$$

The transformLogarithmic element is a child element to the queryIndependentFeature element, and includes the following attributes.

| Attribute | Mandatory | Meaning |
|---|---|---|
| b | required | Parameter |
| max | required | Upper bound |

Transform$(x)=\text{Log}_e(\min(x,\max)+b)$

The precompute element is a child element to the queryIndependentFeature element, and includes the following attributes. This element, when present, instructs a ranker to pre-compute (optimize) computation of a transform function for the range of x argument from the "from" value, inclusive, to the "to" value, exclusive.

| Attribute | Mandatory | Meaning |
|---|---|---|
| from | required | Lower bound |
| to | required | Exclusive upper bound |

Following is an example of a relevance model XML schema in accordance with the disclosed architecture:

```
<?xml version="1.0"?>
<xs:schema attributeFormDefault="unqualified"
elementFormDefault="qualified"
targetNamespace="http://schemas.company.com/office/20xx/rankingModel"
xmlns:xs="http://www.w3.org/2001/XMLSchema"
xmlns:rm="http://schemas.company.com/office/20xx/rankingModel">
    <xs:simpleType name="GUIDType">
        <xs:restriction base="xs:string">
            <xs:pattern value="[A-Fa-f0-9]{8}-([A-Fa-f0-9]{4}-){3}[A-Fa-f0-9]{12}"/>
        </xs:restriction>
    </xs:simpleType>
    <xs:simpleType name="pidType">
        <xs:restriction base="xs:unsignedShort">
            <xs:minInclusive value="1"/>
        </xs:restriction>
    </xs:simpleType>
    <xs:simpleType name="weightType">
        <xs:restriction base="xs:float">
            <xs:minInclusive value="-1000000"/>
            <xs:maxInclusive value="1000000"/>
        </xs:restriction>
    </xs:simpleType>
    <xs:simpleType name="nonnegativeWeightType">
        <xs:restriction base="xs:float">
            <xs:minInclusive value="0"/>
            <xs:maxInclusive value="1000000"/>
        </xs:restriction>
    </xs:simpleType>
    <xs:simpleType name="lengthNormalizationType">
        <xs:restriction base="xs:float">
            <xs:minInclusive value="0"/>
            <xs:maxInclusive value="1000000"/>
        </xs:restriction>
    </xs:simpleType>
    <xs:complexType name="transformRationalType">
        <xs:attribute name="k" use="required">
            <xs:simpleType>
                <xs:restriction base="xs:float">
                    <xs:minExclusive value="0"/>
                </xs:restriction>
            </xs:simpleType>
        </xs:attribute>
    </xs:complexType>
    <xs:complexType name="transformInvRationalType">
        <xs:attribute name="k" use="required">
            <xs:simpleType>
                <xs:restriction base="xs:float">
                    <xs:minExclusive value="0"/>
                    <xs:maxInclusive value="1000000"/>
                </xs:restriction>
            </xs:simpleType>
        </xs:attribute>
    </xs:complexType>
    <xs:complexType name="transformLinearType">
        <xs:attribute name="max" type="xs:unsignedInt" use="required"/>
    </xs:complexType>
    <xs:complexType name="transformLogarithmicType">
        <xs:attribute name="b" use="required">
            <xs:simpleType>
                <xs:restriction base="xs:float">
```

```
                <xs:minExclusive value="0"/>
                <xs:maxInclusive value="1000000"/>
            </xs:restriction>
        </xs:simpleType>
    </xs:attribute>
    <xs:attribute name="max" type="xs:unsignedInt" use="required"/>
</xs:complexType>
<xs:complexType name="precomputeType">
    <xs:attribute name="from" type="xs:unsignedInt" use="required"/>
    <xs:attribute name="to" type="xs:unsignedInt" use="required"/>
</xs:complexType>
<xs:complexType name="queryIndependentFeatureType">
    <xs:sequence>
        <xs:choice>
            <xs:element name="transformRational" type="rm:transformRationalType"/>
            <xs:element name="transformInvRational" type="rm:transformInvRationalType"/>
            <xs:element name="transformLinear" type="rm:transformLinearType"/>
            <xs:element name="transformLogarithmic" type="rm:transformLogarithmicType"/>
        </xs:choice>
        <xs:element minOccurs="0" name="precompute" type="rm:precomputeType"/>
    </xs:sequence>
    <xs:attribute name="name" type="xs:string" use="optional" />
    <xs:attribute name="pid" type="rm:pidType" use="required" />
    <xs:attribute name="default" type="xs:unsignedInt" use="required" />
    <xs:attribute name="weight" type="rm:weightType" use="required" />
</xs:complexType>
<xs:complexType name="categoryFeatureType">
    <xs:sequence>
        <xs:element maxOccurs="unbounded" name="category">
            <xs:complexType>
                <xs:attribute name="name" type="xs:string" use="optional" />
                <xs:attribute name="value" use="required">
                    <xs:simpleType>
                        <xs:restriction base="xs:unsignedInt">
                            <xs:maxInclusive value="1000000"/>
                        </xs:restriction>
                    </xs:simpleType>
                </xs:attribute>
                <xs:attribute name="weight" type="rm:weightType" use="required" />
            </xs:complexType>
        </xs:element>
    </xs:sequence>
    <xs:attribute name="name" type="xs:string" use="optional" />
    <xs:attribute name="pid" type="rm:pidType" use="required" />
    <xs:attribute name="default" type="xs:unsignedInt" use="required" />
</xs:complexType>
<xs:complexType name="languageFeatureType">
    <xs:attribute name="name" type="xs:string" use="optional" />
    <xs:attribute name="pid" type="rm:pidType" use="required" />
    <xs:attribute name="default" use="required">
        <xs:simpleType>
            <xs:restriction base="xs:unsignedByte">
                <xs:maxInclusive value="1"/>
            </xs:restriction>
        </xs:simpleType>
    </xs:attribute>
    <xs:attribute name="weight" type="rm:weightType" use="required" />
</xs:complexType>
<xs:complexType name="queryIndependentFeaturesType">
    <xs:choice minOccurs="1" maxOccurs="unbounded">
        <xs:element name="queryIndependentFeature" type="rm:queryIndependentFeatureType"/>
        <xs:element name="categoryFeature" type="rm:categoryFeatureType"/>
        <xs:element name="languageFeature" type="rm:languageFeatureType"/>
```

-continued

```
        </xs:choice>
    </xs:complexType>
    <xs:complexType name="queryDependentFeatureType">
        <xs:attribute name="name" type="xs:string" use="optional" />
        <xs:attribute name="pid" type="rm:pidType" use="required" />
        <xs:attribute name="weight" type="rm:nonnegativeWeightType" use="required"/>
        <xs:attribute name="lengthNormalization" type="rm:lengthNormalizationType" use="required" />
    </xs:complexType>
    <xs:complexType name="queryDependentFeaturesType">
        <xs:sequence>
            <xs:element minOccurs="1" maxOccurs="unbounded" name="queryDependentFeature" type="rm:queryDependentFeatureType"/>
        </xs:sequence>
    </xs:complexType>
    <xs:complexType name="rankingModelType">
        <xs:all>
            <xs:element name="queryDependentFeatures" type="rm:queryDependentFeaturesType"/>
            <xs:element name="queryIndependentFeatures" type="rm:queryIndependentFeaturesType" minOccurs="0"/>
        </xs:all>
        <xs:attribute name="id" type="rm:GUIDType" use="required" />
        <xs:attribute name="name" type="xs:string" use="optional" />
        <xs:attribute name="description" type="xs:string" use="optional" />
    </xs:complexType>
    <xs:element name="rankingModel" type="rm:rankingModelType"/>
</xs:schema>
```

Put another way, disclosed is computer-implemented ranking model system that comprises a customizable ranking model that employs a text ranking formula for processing multiple text fields, and a schema that represents elements of the customizable ranking model in XML. Some of the text fields can be defined out-of-the box and other fields can be introduced like other elements. The text ranking formula is a BM25F ranking function. The schema represents query dependent ranking features and query independent ranking features. The schema represents a query independent ranking feature that includes parameters for at least one of a static feature or a static feature for a small number of enumerable values, and a query dependent ranking feature that includes parameters for query language matching. The schema represents a ranking model element that includes a list of weightings for possible values of a feature. The schema represents a ranking model element that employs an arbitrary transform and associated parameters, where the arbitrary transform and associated parameters are one of a rational transform, an inverse rational transform, a linear transform, and a logarithmic transform.

Note that as described above, the language feature element 214 of FIG. 2 is illustrated in association with query independent features. This is only one example of a model schema, however. A query dependent feature is any field that can be used as a stream for BM25F; in other words, any feature that requires matching on the query terms entered by the user. There is other information from the user query, including context, such as language, that can be used as ranking, and is query dependent. However, in situations where a user employs the same language for all queries, the language feature can also operate as query independent. In other words, the language feature can depend on the query. However, this is not a requirement as the language feature can look at an unchanging stored value. Thus, the language feature can be query dependent, query independent, or dependent on some other variable. In a broader sense, this can be true for any query independent features.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
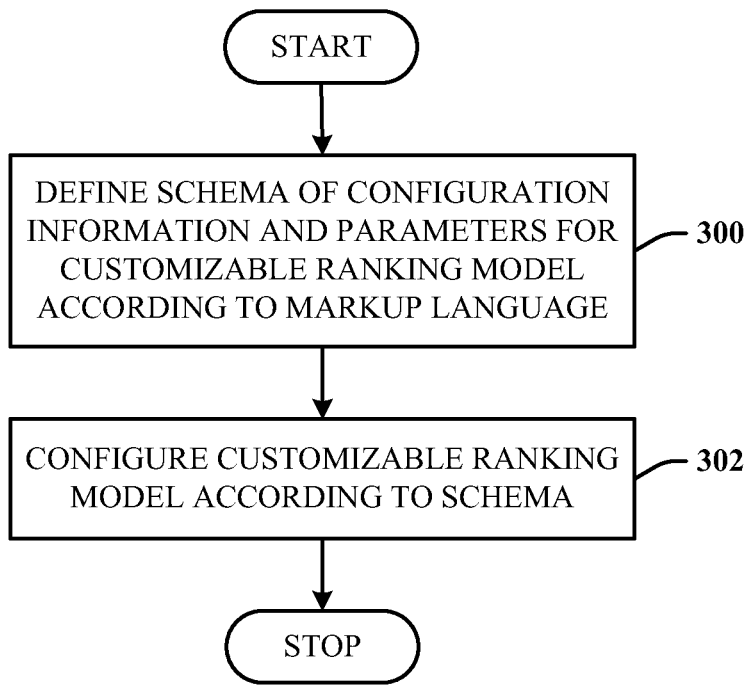
FIG. 3 illustrates a computer-implemented ranking model method in accordance with the disclosed architecture.

FIG. 3 illustrates a computer-implemented ranking model method in accordance with the disclosed architecture. At 300, a schema of configuration information and parameters is defined for a customizable ranking model according to a markup language. At 302, the customizable ranking model is configured according to the schema.

Figure 4:
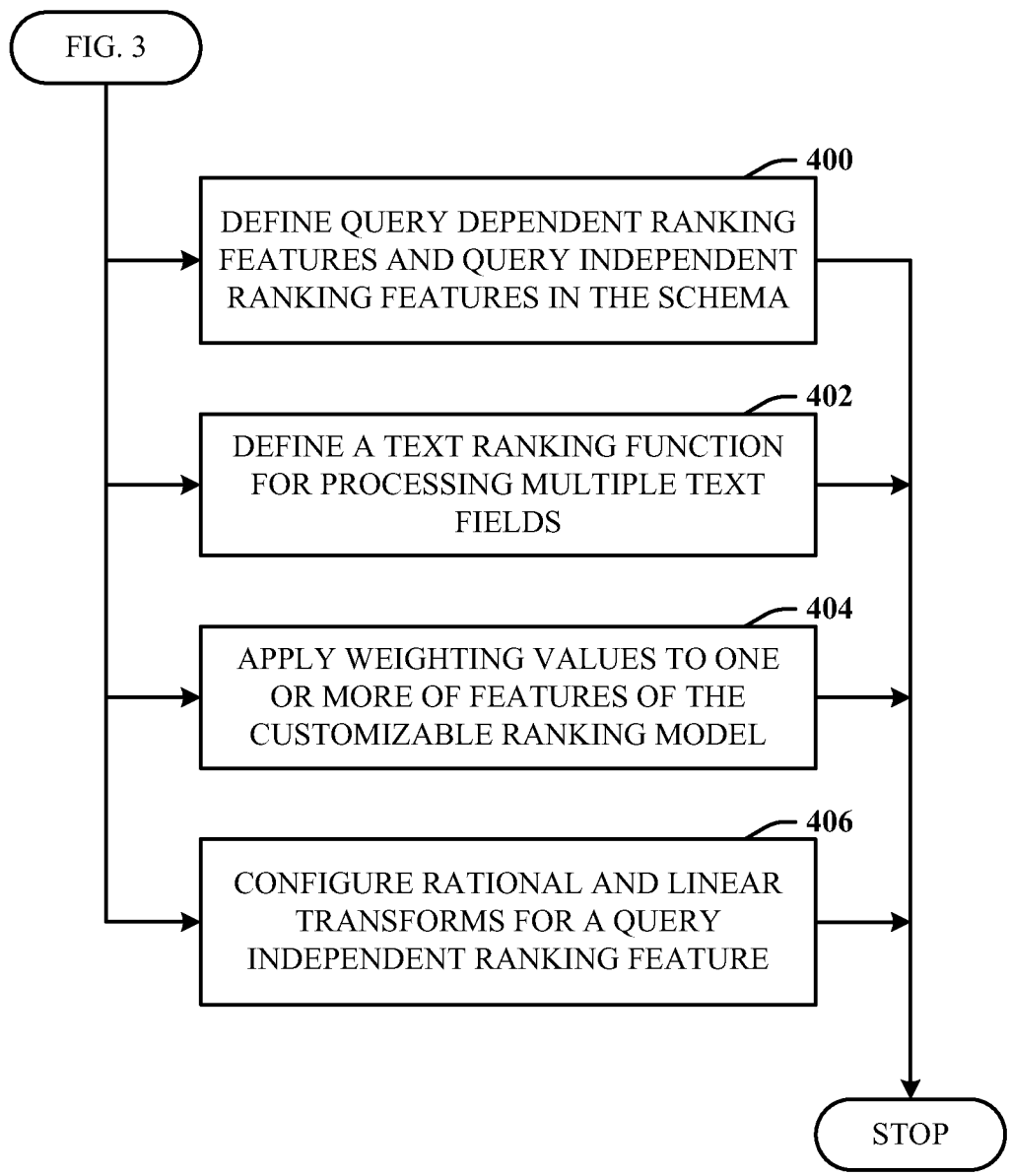
FIG. 4 illustrates additional aspects of the method of FIG. 3.

FIG. 4 illustrates additional aspects of the method of FIG. 3. At 400, query dependent ranking features and query independent ranking features are defined in the schema. At 402, a text ranking function is defined for processing multiple text fields. At 404, weighting values are applied to one or more of features of the customizable ranking model. At 406, rational and linear transforms are configured for a query independent ranking feature.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 5:
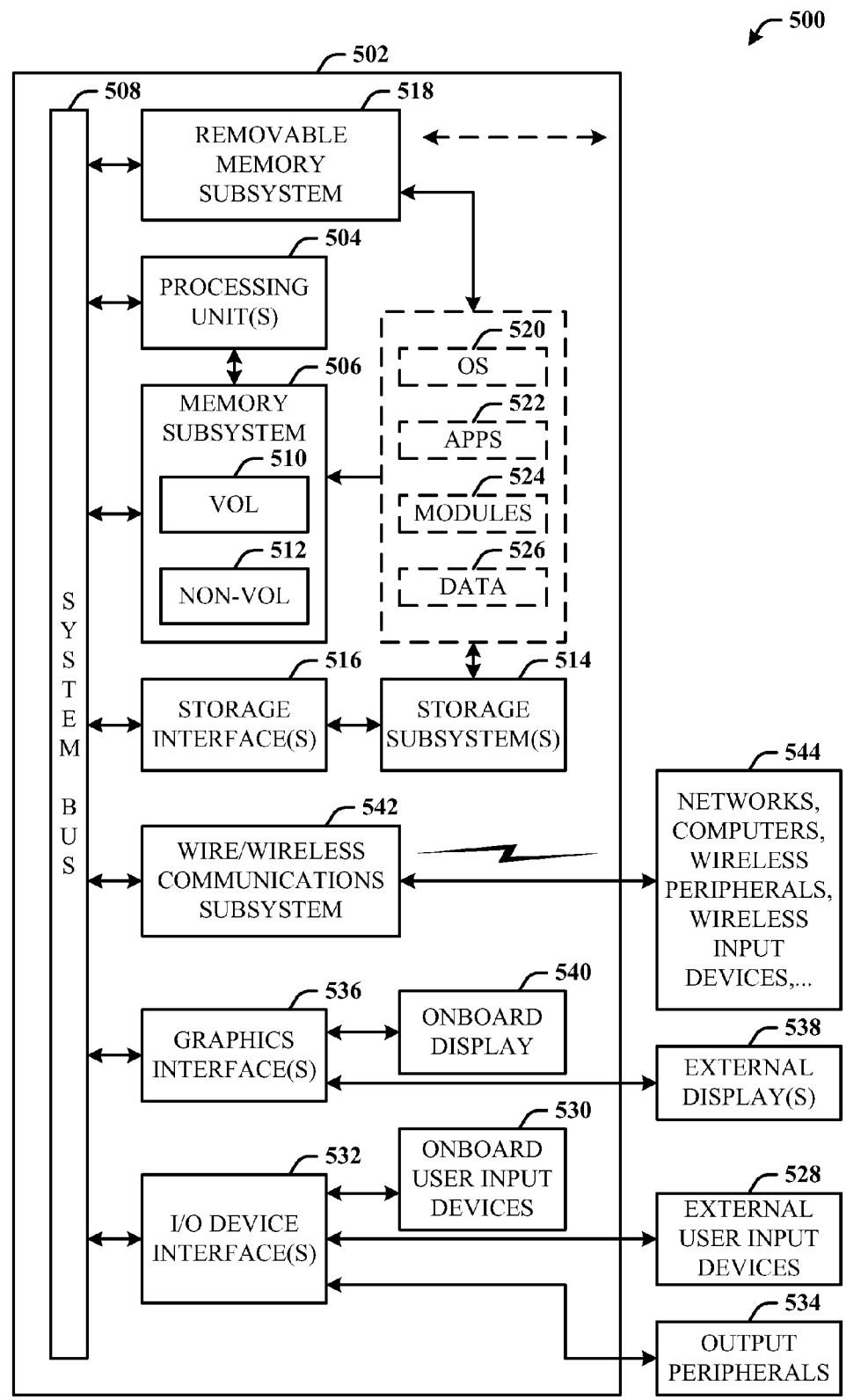
FIG. 5 illustrates a block diagram of a computing system for processing a customizable ranking function represented in a markup language in accordance with the disclosed architecture.

Referring now to FIG. 5, there is illustrated a block diagram of a computing system 500 for processing a customizable ranking function represented in a markup language in accordance with the disclosed architecture. In order to provide additional context for various aspects thereof, FIG. 5 and the following description are intended to provide a brief, general description of the suitable computing system 500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 500 for implementing various aspects includes the computer 502 having processing unit(s) 504, a computer-readable storage such as a system memory 506, and a system bus 508. The processing unit(s) 504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 506 can include computer-readable storage such as a volatile (VOL) memory 510 (e.g., random access memory (RAM)) and non-volatile memory (NON-VOL) 512 (e.g., ROM, EPROM, EEPROM, etc.). A basic input/output system (BIOS) can be stored in the non-volatile memory 512, and includes the basic routines that facilitate the communication of data and signals between components within the computer 502, such as during startup. The volatile memory 510 can also include a high-speed RAM such as static RAM for caching data.

The system bus 508 provides an interface for system components including, but not limited to, the system memory 506 to the processing unit(s) 504. The system bus 508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 502 further includes machine readable storage subsystem(s) 514 and storage interface(s) 516 for interfacing the storage subsystem(s) 514 to the system bus 508 and other desired computer components. The storage subsystem(s) 514 can include one or more of a hard disk drive (HDD), a magnetic floppy disk drive (FDD), and/or optical disk storage drive (e.g., a CD-ROM drive DVD drive), for example. The storage interface(s) 516 can include interface technologies such as EIDE, ATA, SATA, and IEEE 1394, for example.

One or more programs and data can be stored in the memory subsystem 506, a machine readable and removable memory subsystem 518 (e.g., flash drive form factor technology), and/or the storage subsystem(s) 514 (e.g., optical, magnetic, solid state), including an operating system 520, one or more application programs 522, other program modules 524, and program data 526.

The one or more application programs 522, other program modules 524, and program data 526 can include the entities of the system 100 of FIG. 1, the schema 200 of FIG. 2, and the methods represented by the flow charts of FIGS. 3-4, for example.

Generally, programs include routines, methods, data structures, other software components, etc., that perform particular tasks or implement particular abstract data types. All or portions of the operating system 520, applications 522, modules 524, and/or data 526 can also be cached in memory such as the volatile memory 510, for example. It is to be appreciated that the disclosed architecture can be implemented with various commercially available operating systems or combinations of operating systems (e.g., as virtual machines).

The storage subsystem(s) 514 and memory subsystems (506 and 518) serve as computer readable media for volatile and non-volatile storage of data, data structures, computer-executable instructions, and so forth. Computer readable media can be any available media that can be accessed by the computer 502 and includes volatile and non-volatile internal and/or external media that is removable or non-removable. For the computer 502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 502, programs, and data using external user input devices 528 such as a keyboard and a mouse. Other external user input devices 528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 502, programs, and data using onboard user input devices 530 such a touchpad, microphone, keyboard, etc., where the computer 502 is a portable computer, for example. These and other input devices are connected to the processing unit(s) 504 through input/output (I/O) device interface(s) 532 via the system bus 508, but can be connected by other interfaces such as a parallel port, IEEE 1394 serial port, a game port, a USB port, an IR interface, etc. The I/O device interface(s) 532 also facilitate the use of output peripherals 534 such as printers, audio devices, camera devices, and so on, such as a sound card and/or onboard audio processing capability.

One or more graphics interface(s) 536 (also commonly referred to as a graphics processing unit (GPU)) provide graphics and video signals between the computer 502 and external display(s) 538 (e.g., LCD, plasma) and/or onboard displays 540 (e.g., for portable computer). The graphics interface(s) 536 can also be manufactured as part of the computer system board.

The computer 502 can operate in a networked environment (e.g., IP-based) using logical connections via a wired/wireless communications subsystem 542 to one or more networks and/or other computers. The other computers can include workstations, servers, routers, personal computers, microprocessor-based entertainment appliances, peer devices or other common network nodes, and typically include many or all of the elements described relative to the computer 502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 502 connects to the network via a wired/wireless communication subsystem 542 (e.g., a network interface adapter, onboard transceiver subsystem, etc.) to communicate with wired/wireless networks, wired/wireless printers, wired/wireless input devices 544, and so on. The computer 502 can include a modem or other means for establishing communications over the network. In a networked environment, programs and data relative to the computer 502 can be stored in the remote memory/storage device, as is associated with a distributed system. It will be appreciated that the network connections shown are exemplary and other means of establishing a communications link between the computers can be used.

The computer 502 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer for providing a customizable ranking model, comprising:
   a processor;
   the processor executing a process, wherein the processor is adapted to:
      rank documents resulting from a search through the customizable ranking model;
      use context including language in the customizable ranking model to rank the documents;
      manage single terms in the context as compounds using custom word breaking rules;
      add single terms to a thesaurus for synonym expansion in a query;
      utilizing a locale identifier number for the customizable ranking model to represent a combination of: the language, a region, and a sort for the documents associated with a date, a time, a number, a currency, a formatting, a calendar preference, an input method, and a sorting preference of the documents;
      operating the language as a query dependent feature;
      represent the customizable ranking model through a schema written in a human-readable code; and
      employ a root level ranking model element with a query dependent features element and a query independent features element as child elements as a structure for the elements, wherein the query dependent features element has a child query dependent feature element including property identification, name, weight and length normalization attributes, and the query independent features element has a category feature element, a query independent feature element and a language feature element.

2. The computer of claim 1, wherein the human-readable code is extensible markup language (XML).

3. The computer of claim 1, wherein the schema facilitates application of a ranking function that manages query terms associated with multiple streams of data.

4. The computer of claim 1, wherein the schema represents a ranking model element that includes parameters for at least one of a static feature, a static feature for enumerable values, or query language matching.

5. The computer of claim 1, wherein the schema represents a ranking model element that includes a list of weightings for possible values of a feature.

6. The computer of claim 1, wherein the schema represents ranking model elements that describe at least one of a rational transform type and associated parameters or inverse rational transform type and associated parameters.

7. The computer of claim 1, wherein the schema represents ranking model elements that describe at least one of a linear transform and associated parameters or a logarithmic transform and associated parameters.

8. A computer for providing a customizable ranking model, comprising:
   a processor;
   the processor executing a process, wherein the process is adapted to:
      employ a text ranking formula for processing multiple text fields through the customizable ranking model;
      tune the customizable ranking model according to a language, a vertical, and a site experience;
      calculate scores using the text ranking formula according to a function of features defined in the customizable ranking model;
      add single terms to a thesaurus for synonym expansion in a query;
      determine term frequency in the text ranking formula utilizing number of times a term appears in a property of documents including the text fields while evaluating a length of the property as a number of terms, an average length of the property in a collection in the documents, a number of the documents in a corpus, the number of the documents containing the term, a weight of a field, and a weight of length normalization;
      represent elements of the customizable ranking model ranked according to the scores in XML through a schema; and
      employ a root level ranking model element with a query dependent features element and a query independent features element as child elements as a structure for the elements, wherein the query dependent features element has a child query dependent feature element including property identification, name, weight and length normalization attributes, and the query independent features element has a category feature element, a query independent feature element and a language feature element.

9. The computer of claim 8, wherein the text ranking formula is a BM25F ranking function.

10. The computer of claim 8, wherein the schema represents query dependent ranking features and query independent ranking features.

11. The computer of claim 8, wherein the schema represents a query independent ranking feature that includes parameters for at least one of a static feature or a static feature for enumerable values, and a query dependent ranking feature that includes parameters for query language matching.

12. The computer of claim 8, wherein the schema represents another ranking model element that employs an arbitrary transform and associated parameters.

13. The computer of claim 12, wherein the arbitrary transform and associated parameters are one of a rational transform, an inverse rational transform, a linear transform, and a logarithmic transform.

14. A computer-implemented ranking model method, comprising:
- defining a schema of configuration information and parameters for a customizable ranking model according to a markup language;
- tuning the customizable ranking model according to a language, a vertical, and a site experience;
- operating the language as a query independent feature;
- utilizing context including the language in the customizable ranking model;
- manage single terms in the context as compounds using custom word breaking rules;
- adding single terms to a thesaurus for synonym expansion of the single terms in a query;
- calculating scores using a formula according to a function of features defined in the customizable ranking model;
- determining term frequency in a text ranking formula utilizing number of times the single terms appear in property of documents while evaluating a length of the property as a number of the single terms, an average length of the property in a collection in the documents, a number of the documents in a corpus, a number of documents containing the single terms, a weight of a field, and a weight of length normalization;
- utilizing a locale identifier number for the customizable ranking model to represent a combination of: the language, a region, and a sort for documents associated with at a date, a time, a number, a currency, a formatting, a calendar preference, an input method, and a sorting preference of the context of the documents;
- employing a root level ranking model element with a query dependent features element and a query independent features element as child elements as a structure for the elements, wherein the query dependent features element has a child query dependent feature element including property identification, name, weight and length normalization attributes, and the query independent features element has a category feature element, a query independent feature element and a language feature element; and
- configuring the customizable ranking model according to the schema sorted according to the scores.

15. The method of claim 14, wherein the markup language of the schema is XML.

16. The method of claim 14, further comprising defining a text ranking function for processing multiple text fields.

17. The method of claim 14, further comprising applying weighting values to features of the customizable ranking model.

18. The method of claim 14, further comprising configuring rational and linear transforms for a query independent ranking feature.

* * * * *